United States Patent [19]

Glachet et al.

[11] Patent Number: 4,549,839
[45] Date of Patent: Oct. 29, 1985

[54] MASTER-SLAVE TELESCOPIC REMOTE MANIPULATOR

[75] Inventors: Charles Glachet; Daniel Francois, both of Vendome; Jean Tentelier, La Ville aux Clercs Moree; Christian Frioux, Vendome, all of France

[73] Assignees: Commissariat a l'Energie Atomique, Paris; La Calhene Societe Anonyme, Bezon, both of France

[21] Appl. No.: 461,031

[22] Filed: Jan. 26, 1983

[30] Foreign Application Priority Data

Feb. 3, 1982 [FR] France .................... 82 01712

[51] Int. Cl.⁴ .................................................. B25J 3/00
[52] U.S. Cl. .......................................... 414/7; 414/718; 414/736; 901/21
[58] Field of Search ................ 414/728, 1–7, 414/718, 736; 901/29, 14–18, 21

[56] References Cited

U.S. PATENT DOCUMENTS

| 595,051 | 12/1897 | Elieson | 474/149 |
|---|---|---|---|
| 1,813,011 | 7/1931 | Adams | 474/149 |
| 2,436,959 | 3/1948 | Ekin et al. | 414/468 X |
| 2,482,326 | 9/1949 | Davis | 474/149 |
| 2,825,478 | 3/1958 | Hunnicutt et al. | 414/468 |
| 3,212,651 | 10/1965 | Specht | 901/29 X |
| 3,481,493 | 12/1969 | Walischmiller | |
| 3,876,098 | 4/1975 | Cawrse et al. | 414/505 X |

FOREIGN PATENT DOCUMENTS

| 2327942 | 1/1975 | Fed. Rep. of Germany | 414/111 |
|---|---|---|---|
| 1314129 | 1/1963 | France | |
| 1380439 | 10/1964 | France | |
| 1542994 | 10/1968 | France | |
| 815515 | 6/1959 | United Kingdom | 901/29 X |
| 1392916 | 5/1975 | United Kingdom | 414/502 |

Primary Examiner—Terrance L. Siemens
Attorney, Agent, or Firm—Pearne, Gordon, Sessions, McCoy, Granger & Tilberry

[57] ABSTRACT

A telescopic remote manipulator includes a rotary passage block which passes through a partition, a telescopic master arm having upper and lower segments, and a telescopic slave arm having upper, intermediate and lower segments. The arms are articulated by their upper segments on the passage block by pins. A control handle and gripping member are respectively mounted on the free ends of the master and slave arms. Means are provided for transmitting to the gripping member movements of the handle and include cable means associated with the master arm and cable means associated with the slave arm, both coacting with a rotary shaft in the passage block to transmit the handle movements to the gripping member. The slave arm cable means pass over pulleys carried by a mobile carriage positioned externally of the slave arm and then on pulleys mounted on the slave arm in the vicinity of its shoulder pin. Means are provided for displacing the mobile carriage along the slave arm, when there is a variation in the length of the slave arm, in the opposite direction of movement of the slave arm and over a distance equal to half the length variation. The means for displacing the carriage include opposing cable means whose ends are fixed to the slave arm and pass over pulleys mounted on the carriage and the upper, intermediate and lower segments of the slave arm.

7 Claims, 9 Drawing Figures

MASTER-SLAVE TELESCOPIC REMOTE MANIPULATOR

BACKGROUND OF THE INVENTION

The present invention relates to a telescopic remote manipulator of the master-slave type and more specifically relates to the systems by cables, bands or any similar means within such a manipulator, which make it possible to transmit from the slave side the movements performed on the master side of the manipulator. Throughout the text, the term cables or bands will be used to designate all similar means making it possible to fulfil such a function.

It is known that manipulators of the master-slave type comprise a master arm equipped with a control handle accessible to an operator and a slave arm, which is generally identical to the master arm and which is equipped with a tool, such as a gripping claw or the like. The slave arm is disposed within a cell which is not accessible to the operator, due to the presence of an atmosphere or dangerous products, such as radioactive products within the said cell. The master arm and the slave arm are provided with the same number of degrees of freedom and are mechanically connected through the cell wall in such a way that any movement of the master arm and/or its control handle controlled by the operator leads to identical movement of the slave arm and/or the gripping claw. A window made in the partition or bulkhead of the cell thus makes it possible for the operator to remotely carry out the desired manipulations within the cell.

Furthermore, master-slave remote manipulators are subdivided into two basic groups. The first of these groups involves articulated manipulators in which the master and slave arms in each case comprise several articulated segments, which reproduce movements comparable to those of the human arm, in the most frequent arm when there are two such segments. The second group is that to which the present invention refers and involves telescopic manipulators in which each arm comprises several segments mounted in telescopic manner, in order to permit a modification to the length of these arms.

More specifically, the master-slave telescopic manipulator according to the invention comprises a telescopic master and slave arm, said arms being articulated to a passage or traverse block about two shoulder pins, which are normally parallel to one another and orthogonal to the axis of the block, which passes through the cell partition and is mounted so as to rotate about its own axis. The end of each of these arms consequently has three degrees of positioning freedom.

Moreover, at each of the ends of these arms there is a toggle joint on which is mounted the control handle for the master arm and the gripping claw for the slave arm. Each toggle joint rotates relative to the arm axis corresponding thereto and also permits the rotation of the handle and claw on the one hand about an axis orthogonal to the axis of the arm, and on the other hand about its own axis. Finally, the opening and closing of the claw can be controlled by manipulating a trigger or catch on the control handle. These degrees of freedom linked with the handle and claw are generally called degrees of orientation freedom.

By convention, hereinafter the degrees of positioning and orientation freedom will be designated as follows:

X: rotation of the arms about the axis of the passage block;
Y: rotation of the arms about their shoulder pin;
Z: variation of the length of the arm;
A: pivoting of the toggle joint about the axis of the arm;
B: pivoting of the handle and claw about an axis orthogonal to the axis of the arm;
C: pivoting of the handle and claw about its own axis.

The claw opening and closing movements are added to these degrees of freedom.

In order to increase the scope of remote manipulators and facilitate accessibility to certain areas of the cell, they are generally equipped with means making it possible to bring about a displacement of the slave arm relative to the master arm, in accordance with one or more degrees of freedom X, Y and Z and independently of any movement of the master arm. In view of the possibility of displacing the length of the slave arm relative to that of the master arm, the slave arm is generally constituted by three segments, which are respectively called the upper segment, the intermediate segment and the lower segment, whilst the slave arm only comprises two segments, which are called the upper segment and the lower segment.

As is known, the transmission to the slave arm of the movements in Z of the master arm, as well as the transmission to the gripping claw of all the movements A, B and C of the control handle, including movement D corresponding to the closing of the claw, are realised along each of the said arms by means of cables, bands or any similar system, whereby at least one cable or band is provided for each of these movements. In order to preserve the sealing of the passage through the cell partition, the transmission of the movements Y, Z, A, B, C and D through said partition takes place by rotary shafts which are parallel to the axis of the passage block and extend within the latter over at least the width of the partition. Transmission of movements between these rotary shafts and the corresponding cables or bands takes place, both on the master and slave side, e.g. by means of angle return pinions, whereof one is carried by the shaft and the other is integral with a capstan on which is wound the cable or band.

It is necessary to provide means on both the master and slave arm sides, as well as for each of the cables ensuring transmission to the gripping claw movements A, B, C, and D imparted to the control handle, for compensating any length variation of the respective arm, so that the length variation has no effect on the transmission of the A, B, C, and D movements. This variation may only be manual for the master arm or either manual or electric for the slave arm. This also applies to the cable of the slave arm ensuring the transmission to the latter of variations in the elongation Z of the master arm, because it is necessary to ensure that an elongation of the electrically controlled slave arm has no effect on the said movement.

In order to solve these compensation problems, in a first type of telescopic manipulator it is proposed to carry out this compensation on the slave arm by providing on each of the cables controlling movements, A, B, C and D of the gripping claw a pulley block system within the arm and which is used for compensating manual variations of the elongation Z and a mobile carriage or slide outside the slave arm and used for compensating electrical variations of the elongation of this arm. It is obvious that only on the side of the master arm is the pulley block system located within the same in order to compensate length variations thereof. This arrangement makes it possible to use the same carriage for compensating on the cable controlling the manual elongation of the slave arm, the variations in the length of said arm resulting from the control of an electrical displacement. However, it has the disadvantage of causing a serious problem of overall dimensions, particularly with respect to the slave arm, as a result of the presence of pulley blocks within said arm, together with a cabling problem due to the complexity of the system leading to a large amount of friction. This disadvantage is made all the more serious in that it tends to reduce the service life of the cables or bands, which leads to serious effects on the efficiency of such a manipulator, due to the complexity of the interventions required on the slave arm.

Telescopic manipulators are also known in which these problems are solved in a rather different way. These manipulators are characterized by the fact that the elongation controls of the slave arm are carried out by means of a single cabling system for the manual control and for the electrical displacement control. It is therefore no longer necessary to provide for compensation on the cables ensuring the control of the different movements of the gripping claw. Thus, the intermediate segment of the slave arm then moves over a distance equal to half that by which the lower segment moves, so that the said compensation is automatically ensured by the advance of the cables between the intermediate segment and the upper segment. However, this system has the disadvantage that any slave arm extension movement of either a manual or electrical nature, leads to double friction between the different segments of the slave arm, which is not desirable for obvious mechanical reasons.

BRIEF SUMMARY OF THE INVENTION

The present invention therefore relates to a telescopic remote manipulator equipped with a cabling system differing from that of the known systems and not having the disadvantages inherent therein.

The present invention therefore specifically relates to a telescopic remote manipulator comprising a block for passing through a partition which rotates about its own axis, a telescopic master arm constituted by an upper segment and a lower segment and a telescopic slave arm constituted by an upper segment, an intermediate segment and a lower segment, said arms being articulated by their upper segments on the passage block about two shoulder pins orthogonal to the block axis, a control handle mounted at the free end of the master arm, a gripping member mounted at the free end of the slave arm, means for the transmission to the slave arm and gripping member of movements imparted to the master arm and to the control handle, and means for displacing the slave arm relative to the master arm making it possible to modify the length and orientation of the arm about its shoulder pin and about the axis of the passage block without modifying the corresponding coordinates of the master arm, the means for transmitting to the gripping member movements imparted to the control handle comprising, for each movement, at least one first cable or band associated with the master arm for transmitting the corresponding movement of the control handle to a rotary shaft located in the passage block and at least one second cable or band associated with the slave arm for transmitting the corresponding movement of the rotary shaft to the gripping member, wherein all the said second cables or bands associated with the slave arm pass over pulleys carried by a single mobile carriage positioned externally of the slave arm and then on pulleys mounted on the slave arm in the vicinity of its shoulder pin in order to directly control the gripping member or the lower segment of the slave arm, and wherein means are provided for displacing the carriage along the slave arm, when there is a variation in the length thereof which can be controlled by the transmission means and by the displacement means in the opposite direction and over a distance equal to half said length variation.

As a result of these characteristics, the cabling of the slave arm is particularly simple and there is no pulley block system within the arm. Moreover, the manual extension of the slave arm merely involves a displacement of the lower segment thereof, in such a way that friction is at a minimum from this standpoint and the manual control of this extension is facilitated.

According to a preferred embodiment of the invention, the means for displacing the carriage comprise an opposing cable or band, whose ends are fixed respectively to the lower end of the upper segment and to the upper end of the lower segment of the slave arm, and which successively passes onto the pulleys respectively mounted on the carriage, at the lower end of the upper segment, at the upper end of the intermediate segment and at the lower end of the intermediate segment.

According to another feature of the invention, the first cables or bands associated with the master arm pass over pulleys carried by a second mobile carriage positioned externally of the master arm and then on pulleys mounted on the master arm in the vicinity of its shoulder pin, in order to be directly controlled by the control handle or by the lower segment of the master arm, and means are provided for displacing the second carriage along the master arm, when there is a length variation of the latter in the opposite direction and over a distance equal to half said length variation.

Preferably, the means for displacing the second carriage comprise a second opposing cable or band, whose ends are respectively fixed to the lower part of the upper segment and to the upper part of the lower segment of the master arm and which successively passes over the pulleys mounted respectively on the second carriage and at the lower end of the upper segment of the master arm.

According to yet another feature of the invention, the means for transmitting to the slave arm variations in the length of the master arm comprise at least one third cable or band associated with the master arm for transmitting the movement of the lower segment of the master arm to another rotary shaft located in the passage block and at least one fourth cable or band associated with the slave arm for transmitting the corresponding movement of this rotary shaft to the lower segment of the slave arm, said fourth cable or band passing over at least one pulley carried by a third mobile carriage positioned externally of the slave arm and then on at least one pulley mounted on the slave arm in the vicinity of its shoulder pin, in order to directly control the displacement of the lower segment relative to the other segments of the slave arm, means being provided for displacing the third carriage along the slave arm, when there is a variation in the length of the latter across said transmission means in the opposite direction and over a distance equal to half said length variation.

Preferably, the means for displacing this third carriage comprise a third opposing cable or band, whose ends are respectively fixed to the lower part of the upper segment and to the upper part of the intermediate segment of the slave arm, and which passes successively over a pulley carried by the third carriage and a pulley carried at the lower end of the upper segment of the slave arm.

In order to increase the length of the segments constituting the arms, each of the cables or bands of the transmission means, in the vicinity of the shoulder pin of the corresponding arm, preferably passes over at least one pulley carried by the upper segment of said arm and positioned above the shoulder pin on both the slave arm and the master arm. The resulting increase in the length of these segments has the effect of improving the relationship between the length of these arms when extended and when retracted. This feature also makes it possible to improve the displacement in Y of these arms and to balance the length variation of the cabling during a shoulder movement.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
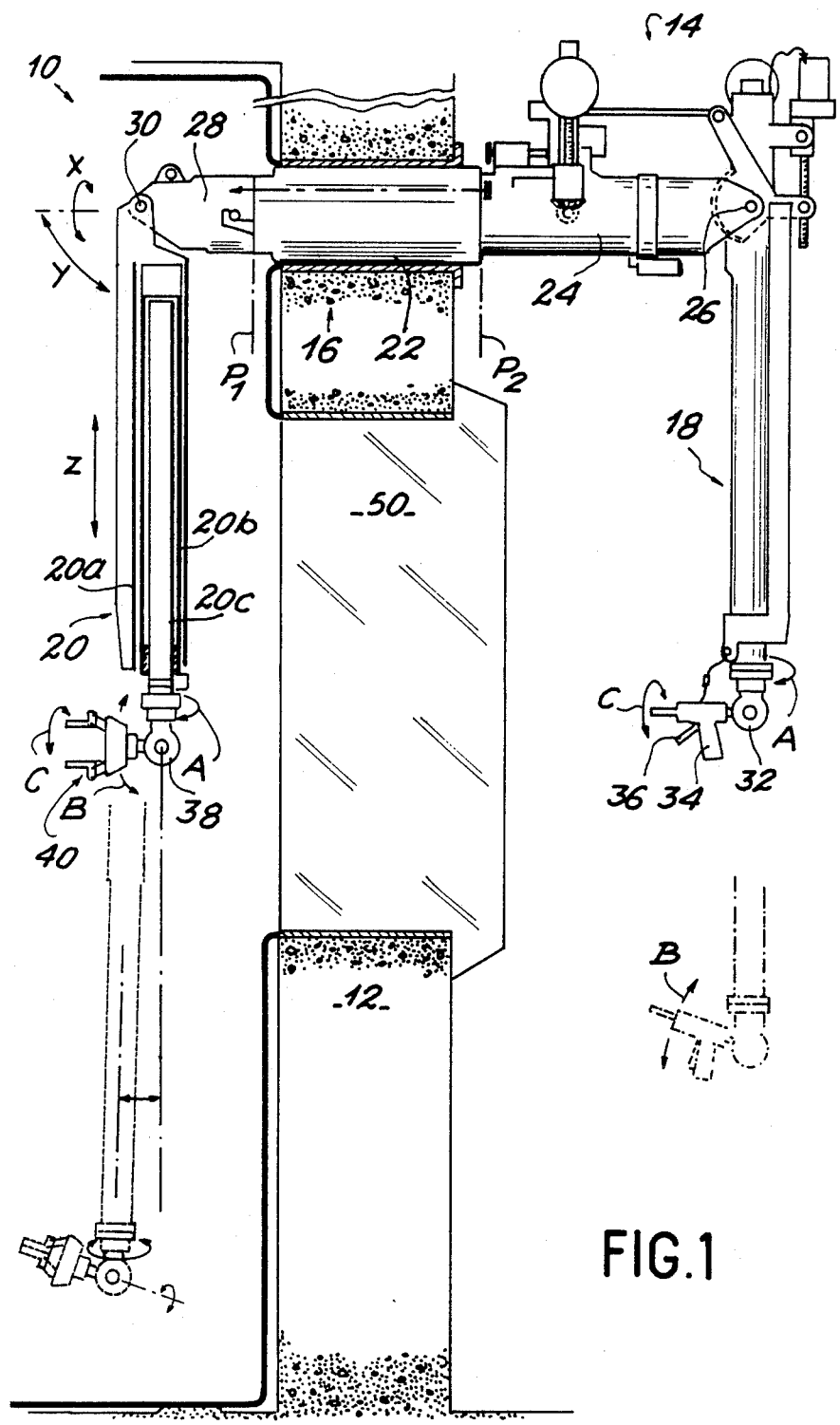
FIG. 1 a part sectional side view diagrammatically showing a master-slave telescopic manipulator according to the invention.

FIG. 1 shows a vertical partition or bulkhead 12 of a cell 10 containing an atmosphere or products which must be isolated as a result of their dangerous nature or the need to protect them from the environment. In particular, cell 10 can contain radioactive products.

When handling operations have to be carried out in such a cell, they must be remotely controlled from the outside and for this purpose remote manipulators are used. Preferably, a window 50 is provided in partition 12, in order to permit direct observation of the handling operation on the part of the operator. In certain conditions, the window 50 can be eliminated and replaced by an electronic system incorporating one or more television cameras located within the cell and connected to externally positioned screens.

According to the invention, a master-slave telescopic manipulator 14 is used, which comprises a passage block 16 passing through partition 12 and to the ends of which are articulated, at the end of cell 10, a telescopic master arm 18 and, within cell 10, a telescopic slave arm 20.

More specifically, the passage block 16 comprises a cylindrical part 22 mounted so as to rotate in partition 12 about its horizontal axis, an overhanging part 24 positioned outside cell 10 and supporting master arm 18 in such a way that it can rotate about a shoulder pin 26 orthogonal to the axis of part 22, and an overhanging part 28 positioned within cell 10 and supporting the slave arm 20 via a shoulder pin 30, which is also orthogonal to the horizontal axis of part 22. Shoulder pin 30 is normally parallel to shoulder pin 26, when there is no displacement in X between the slave and master arms. Parts 24 and 28 of passage block 16 are normally integral with part 22, but they can also be disengaged at the decoupling planes diagrammatically shown at $P_1$ and $P_2$ in FIG. 1 by decoupling means controlled from the outside of cell 10 and which are well known to those skilled in the art. These means do not form part of the invention and will not be described in detail here, it simply being noted that they make it possible to change at random the master and slave arms without impairing the sealing of the cell.

In generally known manner, each of the arms 18 and 20 comprises a plurality of telescopic segments making it possible to modify the length thereof. There are generally two such segments for the master arm 18 and three such segments for the slave arm 20. Thus, it can be seen in FIG. 2 that the master arm 18 comprises an upper segment 18a by which it is articulated to shoulder pin 26 and a lower segment 18b carrying control handle 34. In the same way, it can be seen that the slave arm 20 comprises an upper segment 20a by which it is articulated to shoulder pin 30, an intermediate segment 20b used for modifying the length of the slave arm when an electrical displacement is controlled and a lower segment 20c carrying the gripping claw 40 and used for manually modifying the elongation of the slave arm.

The lower part 18b of the master arm carries at its lower end a toggle joint 32, which supports the control handle 34. The toggle joint 32 is mounted so as to rotate about the axis of arm 18, as indicated by arrow A in FIG. 1. Moreover, the toggle joint 32 is designed so as to permit an orientation of handle 34 about an axis orthogonal to the axis of arm 18, as indicated by arrow B and so as to permit a rotation of handle 34 about its own axis, as indicated by arrow C. Handle 34 also has a catch or trigger 36 making it possible to control the opening and closing of the gripping claw 40 mounted at the lower end of part 20c of the slave arm via a toggle joint 38.

Like toggle joint 32, toggle joint 38 can rotate about the axis of arm 20, as indicated by arrow A, and permits movements of claw 40 in directions B and C identical to those defined for handle 34 relative to toggle joint 32.

The above description shows that each of the arms of the remote manipulator 14 defines three degrees of positioning freedom X, Y and Z determining the position of the end of each of these arms in space, three degrees of orientation freedom A, B and C determining the orientation of the handle and the claw relative to this position, and a claw opening and closing movement D.

In order to fulfil its functions, manipulator 14 must be designed in such a way that any movement of master arm 18 and/or control claw 34 corresponds to an identical or similar movement of slave arm 20 and/or claw 40. For this purpose, transmission means are used, which make it possible to mechanically connect, via passage block 16, master arm 18 to slave arm 20 and handle 34 to gripping claw 40.

More specifically, the transmission of the rotation movement X takes place directly by rotating the assembly constituted by the two arms 18 and 20 and the passage block 16 about the horizontal axis of the latter. The transmission of these rotation movements Y of the arms about their shoulder pins can be realised by a rotary shaft located in block 22 and which meshes via pinions on toothed sectors such as 120 (FIG. 7) fixed to the upper end of each of the arms and centered on the corresponding shoulder pin.

Finally, to each of the degrees of freedom Z, A, B, C and D defined hereinbefore, corresponds a movement transmission means comprising on the one hand, within each of the arms 18 and 20, a cable or band control and, on the other hand, within the passage block 16, rotary shafts arranged in horizontal manner and whose rotation ensures the mechanical transmission to the cable or band of slave arm 20 of the movements imparted to the corresponding cable or band of master arm 18. This solution makes it possible to ensure a good seal at part 22 of passage block 16 and facilitates the decoupling of parts 24 and 28. This decoupling in fact takes place on the rotary shafts, which are constructed in three dismantable parts, in the same way as the passage blocks.

In view of the manual extension possibility $Z_m$ of the master and slave arms and the possibilities of extension by electrical displacement $Z_e$ of the slave arm, it is clear that compensation means must be provided in order that said length variations have no effect on the control of the other movements and particularly on the cable controls associated with each of the arms 18 and 20.

By convention, throughout the remainder of the description, each of the specific elements of a random one of the movements A, B, C, D and Z is designated by a reference number followed by the letter a, b, c, d and z respectively, said figure also being followed by an aprostrophe, when the corresponding element is on the slave side of the manipulator.

Figure 2:
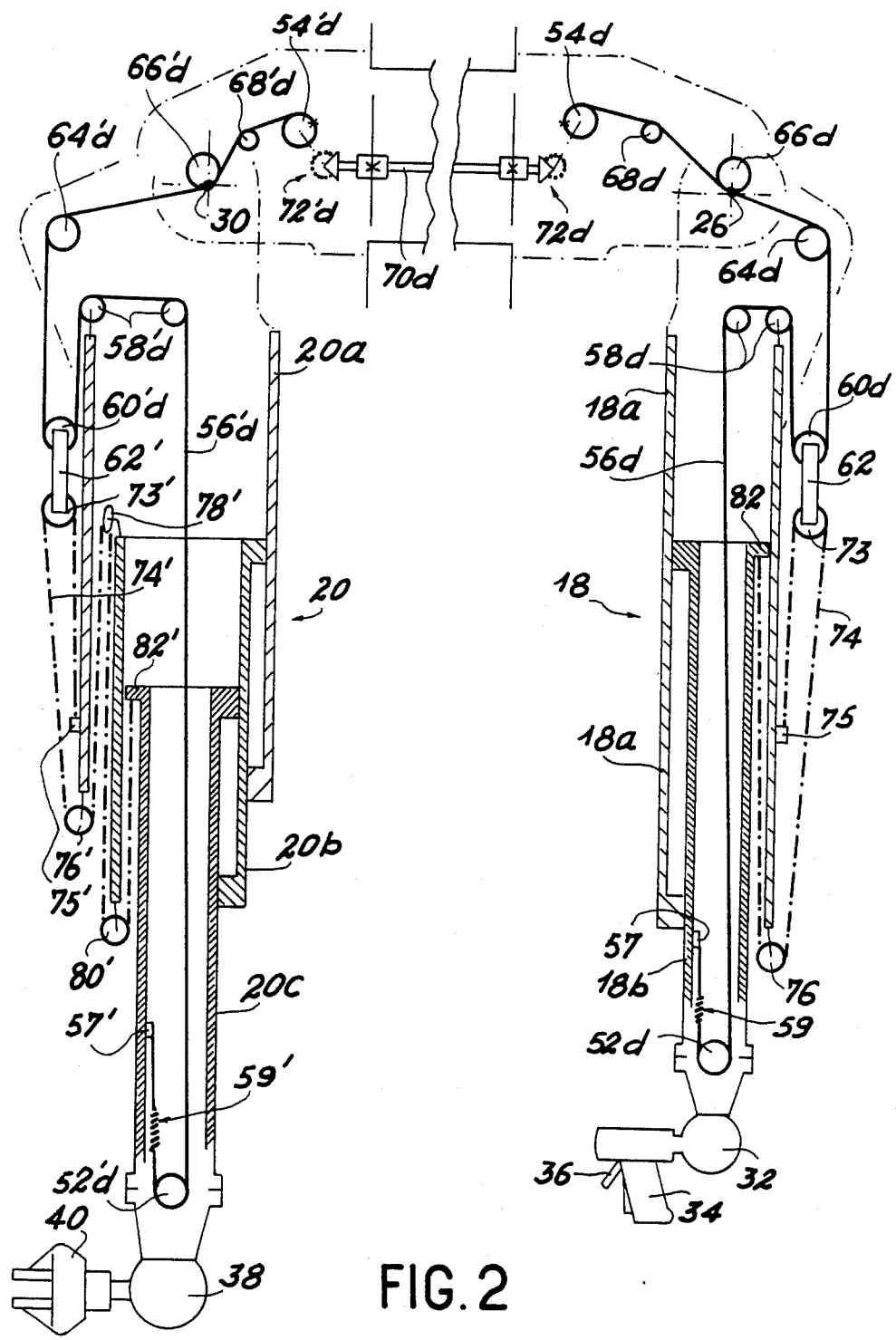
FIG. 2 is a diagrammatic sectional view on a larger scale than FIG. 1 of the means making it possible to control the closing movement D of the gripping claw of the manipulator by means of the control handle.

With reference to FIG. 2, a description will now be given of the means making it possible to control the closing D of claw 40 by acting on trigger 36 of control handle 34. These control means comprise a drive pulley 52d mounted in master arm 18, at the lower end of the lower segment 18b. Known and not shown transmission means make it possible to rotate pulley 52d on operating trigger 36. The rotation of pulley 52d is transmitted by a cable 56d to a capstan 54d, mounted in part 24 of passage block 16. Cable 56d is fixed at 57 in segment 18b, which is slightly above pulley 52d, via a tension spring 59. It is then wound onto pulley 52d and rises within arm 18 up to the upper end of segment 18a, where it passes onto two pulleys 58d, before dropping again outside the arm and then passes onto a pulley 60d carried by a mobile carriage 62 outside the upper segment 18a of the master arm. Cable 56d then rises again up to the upper end of the arm, where it successively passes onto a pulley 64d, beneath a pulley 66d and onto a return pulley 68d before being wound onto the capstan 54d. As will be shown hereinafter, pulley 66d is positioned above the shoulder pin 26 of the master arm, in such a way that cable 56d passes in the immediate vicinity thereof. It will also be shown hereinafter that carriage 62 moves automatically when the elongation of the master arm is modified, in such a way that said modification has no effect on the winding of cable 56d onto pulley 52d and onto capstan 54d.

As has been stated hereinbefore, the transmission of each of the movements across the central part 22 of passage block 16 is effected by a rotary shaft positioned horizontally within said part of the block. In the case of the claw closing movement D, the means making it possible to transmit the control from the claw are shown in FIG. 2, the corresponding control shaft is designated 70d. The transmission to said shaft of the rotary movement of capstan 54d is brought about by angle return pinions 72d, whereof one is fixed to the capstan and the other is fixed to the shaft.

A substantially symmetrical configuration is positioned on the side of the slave arm 20, in such a way that the same numerical references followed by the apostrophe are used for designating the elements corresponding to those of the master arm. Thus, it can be seen in FIG. 2 that the rotary movement of shaft 70d is transmitted to a capstan 54'd by angle return pinions 72'd mounted in part 28 of the passage block. The transmission of the movement of capstan 54'd to the claw is brought about by means of a cable 56'd, whereof one end is wound onto capstan 54'd and whereof the other end is wound onto a pulley 52'd mounted in slave arm 20 at the lower end of the lower segment 20c before being attached at 57' within the latter, by means of a tension spring 59'. From capstan 54'd, the cable 56'd successively passes over a return pulley 68'd, below a pulley 66'd and over a pulley 64'd said three pulleys being located in the vicinity of the shoulder pin 30 of the slave arm. Cable 56'd then descends along the arm and is wound onto a pulley 60'd carried by a mobile carriage 62', positioned outside segment 20a of the slave arm. Cable 56'd then rises again up to two pulleys 58'd mounted at the upper end of the upper segment 20a and then drops again within the slave arm and down to capstan 52'd. Like pulley 66d, pulley 66'd is located above the shoulder pin 30, in such a way that cable 56'd always passes in the immediate vicinity thereof. In the same way, carriage 62' is movable in order to compensate for any variation in the length of the slave arm resulting either from a variation in the length of the master arm, or from an electrical control of a displacement of the slave arm relative to the master arm. In other words, carriage 62' ensures that any such slave arm length variation has no repercussions on cable 56'd at capstans 54'd and 52'd. The tension of cable 56'd is preferably brought about by means of pulley 60'd.

Figure 3:
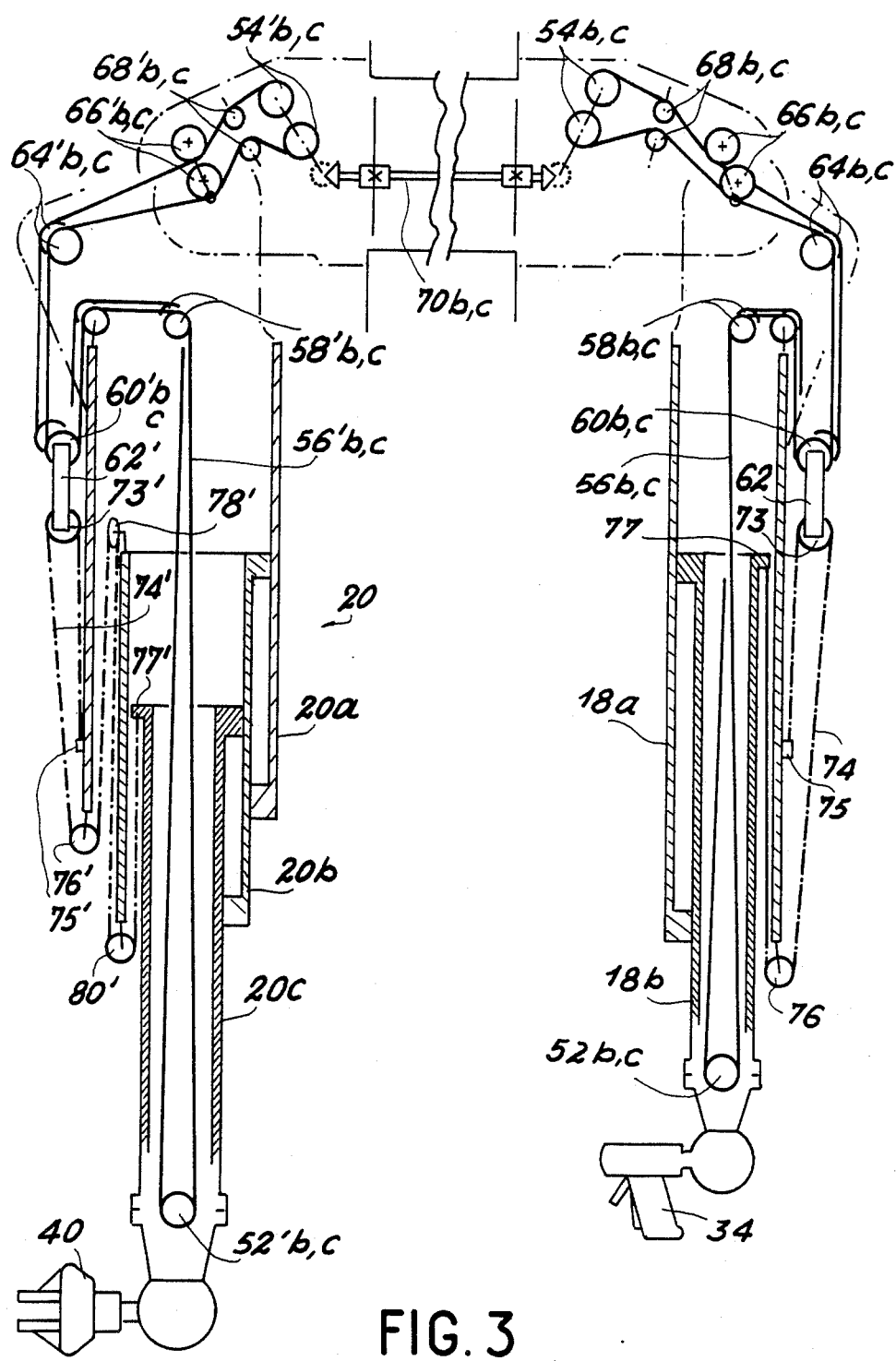
FIG. 3 a view comparable to FIG. 2 showing the means making it possible to transmit to the gripping claw any one of the movements B and C of the control handle.

FIG. 3 shows the means making it possible to transmit any random one of the movements B or C of handle 34 to gripping claw 40. It should be noted than identical transmission means are provided for each of these movements. As shown in FIG. 3, these transmission means are of the same type as described with reference to FIG. 2 for the transmission of the claw closing movement. They will not be described in detail again here and it is simply pointed out that the same elements as in FIG. 2 are designated in FIG. 3 by the same numerical references, followed by b or c, depending on whether they correspond to the transmission of the movements B or C.

The transmission means ensuring the transmission of each of the movements B and C differ from these described with reference to FIG. 2 as a result of the following characteristics. Cables 56b, c and 56'b, c are duplicated, as are the pulleys 58b, c and 60b, c, 64b, c, 66b, c 68b, c onto which they are wound. As a result, the ends of cables 56b, c and 56'b, c are respectively wound onto two capstans 54b, c and 54'b, c mounted in the passage block. Like pulleys 60d and 60'd for cables 56d and 56'd, pulleys 60b, 60c and 60'b 60'c respectively ensure the tensioning of cables 56b, 56c and 56'b, 56'c.

According to the invention, all the pulleys 64b, 64c, 64d on which are wound the cables 56b, 56c, 56d controlling movements B, C and D are mounted on the same carriage or slide 62, which travels outside master arm 18 in order to compensate the length variation thereof. For this purpose, carriage 62 must move in the opposite direction to the variation in the length of the master arm and over a distance equal to half said length variation. Thus, on manually displacing segment 18b in a downwards direction over a distance $Z_m$, carriage 62 must move upwards over a distance $Z_m/2$. Therefore, and in the manner shown in FIG. 2 and 3, the bottom end of carriage 62 is equipped with another pulley 73, onto which is wound an opposing cable 74, whereof one end 75 is fixed to the upper segment 18a of the master arm towards the lower part of said segment and which successively passes onto pulley 73 and pulley 76 mounted at the lower end of segment 18a, before being attached by its opposite end 77 to the upper end of the lower segment 18b. End 75 is used for tensioning cable 74.

In a comparable manner and still in accordance with the invention, all the pulleys 60'b, 60'c and 60'd make it possible to compensate the length variations of slave arm 20 on cables 56'b, 56'c and 56'd are carried by the same carriage or slide 62'. Carriage 62' is mounted outside the slave arm, so that it moves in the opposite direction, when there is a length variation of said arm and over a distance equal to half said length variation. More specifically, in the case of a manual elongation $Z_m$ and/or electrical elongation $Z_e$ of the slave arm, carriage 62' moves upwards over a distance equal to half $Z_m+Z_e/2$ of said elongation. As shown in FIGS. 2 and 3, this result is also obtained by means of an opposing cable 74', whereof a first end 75' is fixed to the lower part of the upper segment 20a of the slave arm and which is successively wound onto a pulley 73' mounted at the lower end of carriage 62', onto a pulley 76' mounted at the lower end of segment 20a, onto a pulley 78' mounted at the upper end of intermediate segment 20b and onto a pulley 80' mounted at the lower end of the same segment, before being fixed by its other end 77' to the upper end of the lower segment 20c. The fixing point 75' of opposing cable 74' serves to tension the latter.

Figure 4:
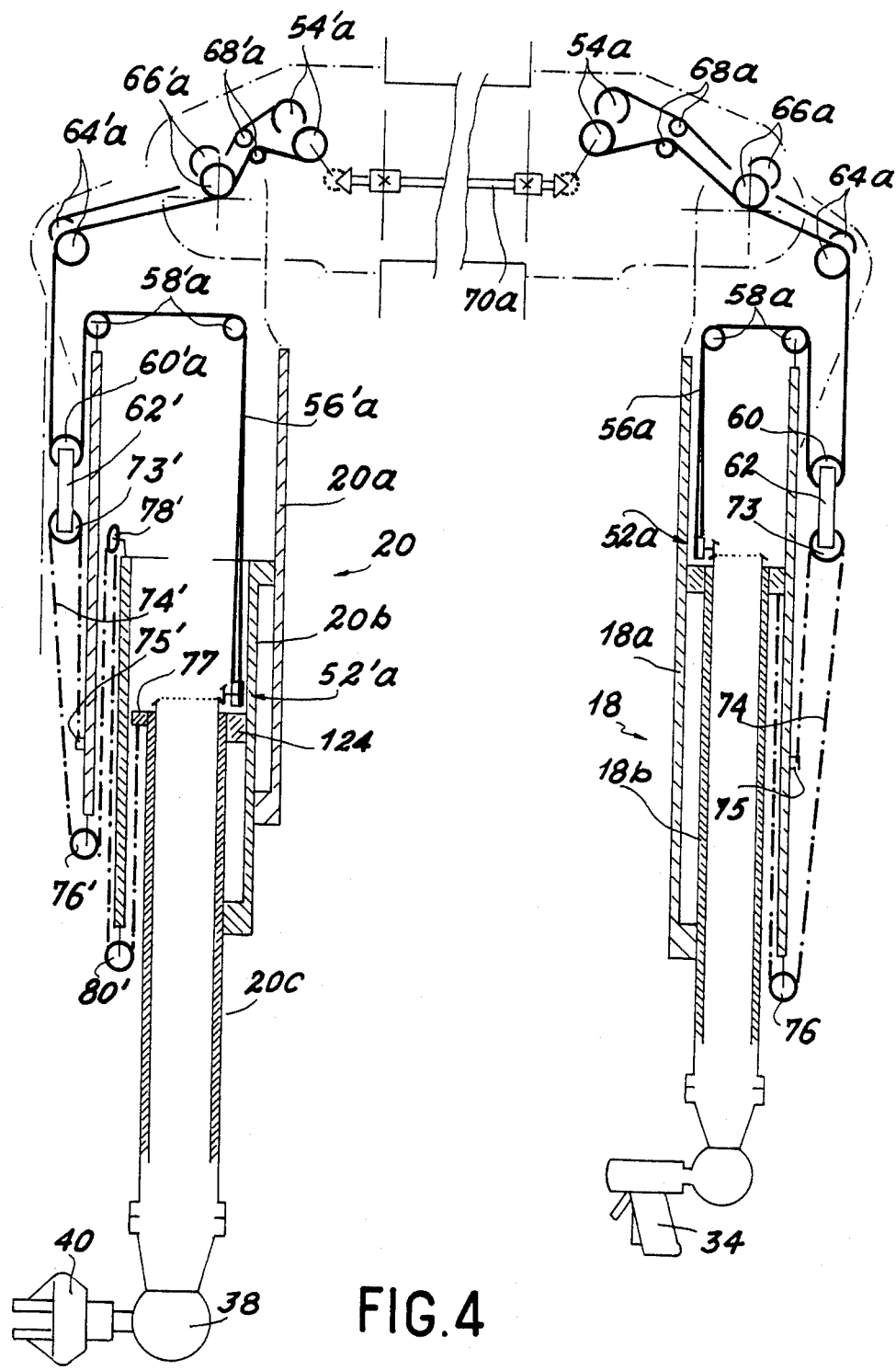
FIG. 4 a view comparable to FIGS. 2 and 3 showing means making it possible to transmit to the lower segment of the slave arm, the rotary movement A of the lower segment of the master arm about its own axis.

FIG. 4 shows the means making it possible to transmit the rotational movement A about its axis of the lower segment 18b of the master arm to the lower segment 20c of the slave arm. These transmission means are substantially identical to the transmission means of movements B and C described hereinbefore with reference to FIG. 3, with the exception of the drive pulleys 52b, c and 52'b, c which are replaced by more complex drive means 52a, 52'a. Therefore, the different elements constituting the transmission means of movement A are designated in FIG. 4 by the same reference numerals as the corresponding elements of FIG. 3 and will be described again.

According to the invention, it is merely pointed out in this connection that the cables 56a, 56'a pass onto pulleys 60a and 60'a, which are carried by the same carriages 62 and 62' as the pulleys 60b, c, d and 60'b, c, d on which pass cables 56b, c, d and 56'b, c, d.

With regards to the drive means 52a, 52'a, they are of an identical nature and a more description of drive means 52'a only will be given with reference to FIG. 5. Cable 56'a descends within slave arm 20 from pulleys 58'a and is wound onto a drive capstan 122, whose shaft is carried by a member 124 slidingly mounted within the intermediate segment 20b of the slave arm. Member 124 is immobilized in rotation within segment 20b by a keyway 128 or by any other means giving the same result. The sliding of member 124 can be improved by rollers such as 130.

Member 124 supports in rotary manner the upper end of the lower segment 20c of the slave arm, particularly via a bearing 132. The rotary movement of capstan 122 is transmitted to segment 20c by a bevel gear 134, integral with the pulley and which meshes on conical teeth 136 formed at the upper end of segment 20c.

Figure 5:
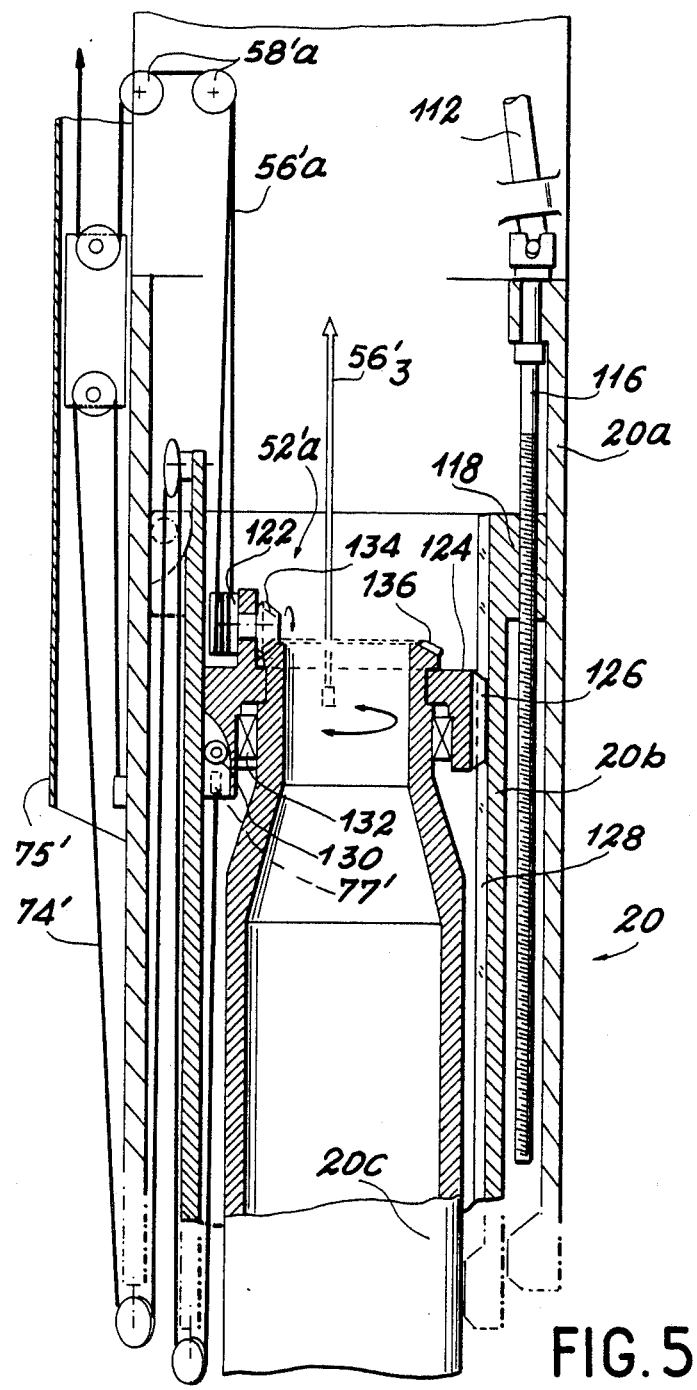
FIG. 5 a larger scale sectional view showing part of the slave arm and particularly the means making it possible to rotate the lower segment thereof during the putting into use of the transmission means of FIG. 4.

FIG. 5 shows that the single opposing cable 74' relative to cables 56'a, 56'b, 56'c and 56'd is attached to member 124. The control cable 56'z of movement Z is also attached to member 124 and will be described hereinafter with reference to FIG. 6.

Drive means 52a are identical to means 52'a and will not be described again. It is merely pointed out in this case that the sliding member is mounted in upper segment 18a and supports lower segment 18b. As for cables 56b, 56c, 56d and 56'b, 56'c, 56'd, the tensioning of cables 56a and 56'a is brought about by pulleys 60a and 60'a carried by carriages 62 and 62'.

Preferably, in order to improve the movement transmission quality, pulleys 52b, c, d and 52'b, c, d are replaced by toothed wheels on which are engaged chains which replace the parts of the cables 56b, c, d and 56'b, c, d able to cooperate with these toothed wheels.

In order to complete the description of the cabling system of the remote manipulator according to the invention, a description will now be given with reference to FIG. 6 of the means making it possible to transmit a telescopic movement $Z_m$ of the master arm to the slave arm.

On the side of master arm 18, said transmission means comprise a cable 56z, fixed at 82 (to a member like member 124 in FIG. 5) to the upper end of the lower segment 18b of the master arm, in such a way that a displacement of cable 56z corresponds to any movement of segment 18b corresponding to a length variation of the master arm. As for the transmission means shown in FIGS. 3 and 4, cable 56z is duplicated, i.e. it comprises two parts, whereof the ends opposite to fixing point 82 are wound onto two capstans 54z, located in part 24 of the passage block.

The advance and tensioning of cable 56z are ensured by means of a certain number of pulleys. Thus, from the fixing 82, part of cable 56z descends between the two segments and is then wound about a pulley 84 and rises outside segment 18a towards one of the capstans 54z, whilst the other part of cable 56z rises directly within segment 18a towards the other capstan 54z. In the same way as for cables 56a, b, c and d described relative to FIGS. 2 to 4, each of the two parts of cable 56z passes over a pulley 64z, then below a pulley 66z at the upper end of the master arm. Each of the parts of the cable then passes over a return pulley 68z, before being wound onto the corresponding capstan 54z. Obviously, complementary pulleys, such as 86 can be provided, particularly in the vicinity of the upper end of segment 18a, in order to ensure a correct advance of that part of cable 56z passing within this segment.

As for the transmission means described hereinbefore, passage through the tight enclosure partition 12 is brought about by means of a rotary horizontal shaft 70z, whose rotation is controlled by one of the capstans 54z, via angle return pinions 72z. Symmetrically, other angle pinions 72′z placed in the slave part 28 of the passage block transmit this rotary movement to a capstan 54′z, onto which is wound one end of a cable 56′z.

As on the master side, the other end of cable 56′z is wound onto a second capstan 54′z located at the end of the first capstan in part 28 of the passage block. In a perfectly symmetrical manner with respect to the master arm, the transmission of the rotation of capstan 54′z to the lower segment 20c of the slave arm is obtained by joining at 82′ cable 56′z to the upper end of segment 20c. The guidance and tensioning of cable 56′z are brought about with the aid of means, which are largely symmetrical to those described hereinbefore for the master arm. Thus, at the lower end of intermediate segment 20b, there is a pulley 84′ onto which is wound a first part of cable 565′z from its fixing point 82′ to segment 20c. This part of cable 56′z then rises up to a first of the capstans 54′z, whilst the other part rises directly to the other capstan from fixing point 82′ to intermediate segment 20b. The two parts of cable 56′z also pass to the upper end of slave arm 20 above pulley 64′z, then below pulleys 66′z, to be finally wound then onto capstan 54′z in part 28 of the passage block, after passing over return pulley 68′z. Pulley 86′ and 92 for guiding those parts of the cable controlling the displacement of lower segment 20c are provided in the upper part of upper segment 20a.

In addition, means must be provided for compensating length variations of slave arm 20 resulting from an electrical displacement control $Z_e$ of said arm relative to the master arm. In other words, it is necesazry for cable 56′z to remain completely taut and its winding onto capstans 54′z must not be modified in the case of an electrical displacement at Z.

Figure 6:
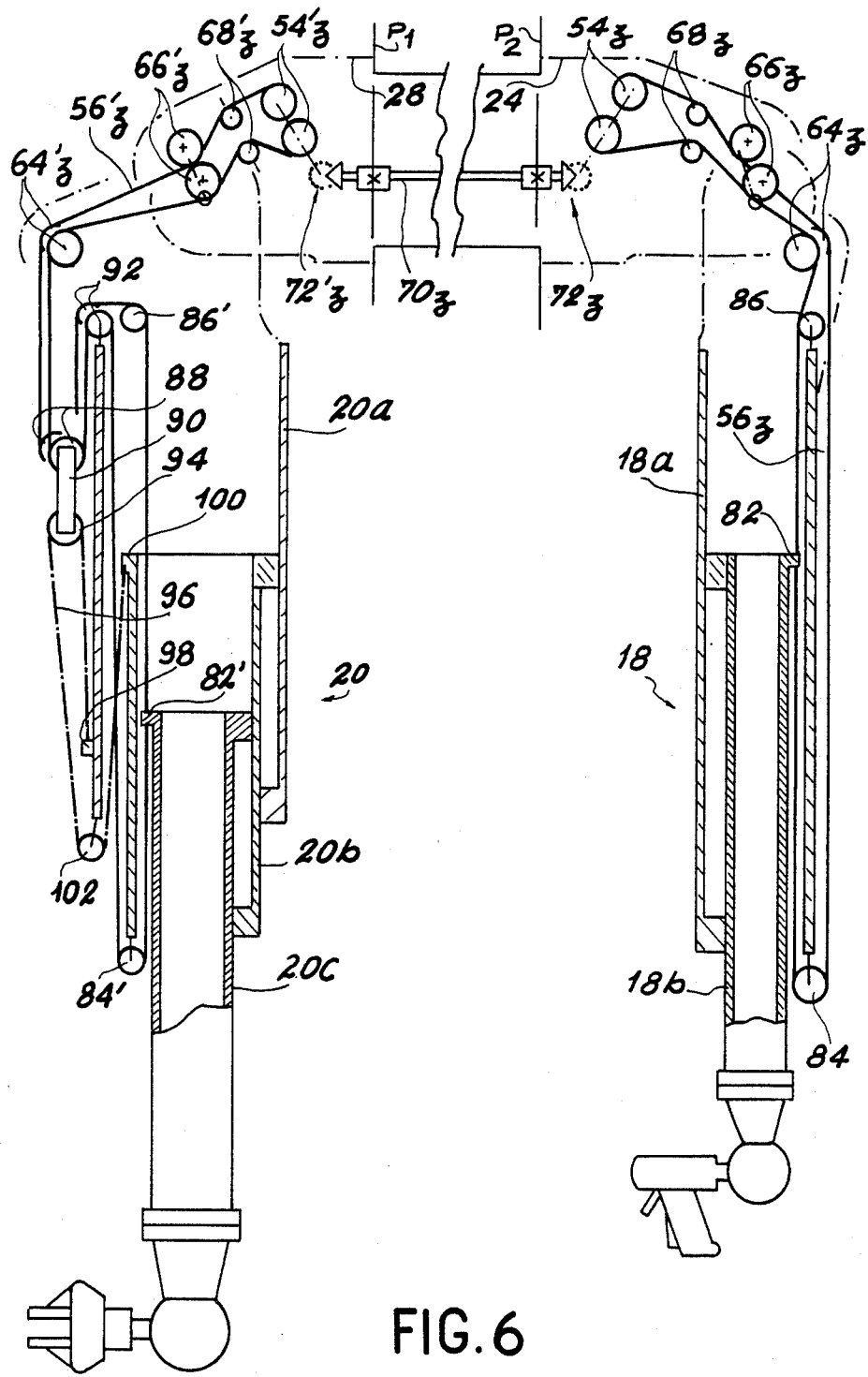
FIG. 6 a view comparable to FIGS. 2, 3 and 4 showing the means making it possible to transmit the manual extension movements of the master arm to the slave arm.

To this end and as shown in FIG. 6, each of the parts of cable 56′z rising towards the upper end of the slave arm is wound onto a pulley 88 carried by a mobile carriage 90 and which also ensures the tensioning before passing onto pulley 64′z. More specifically, each of the parts of cable 56′z passes onto guidance pulley 86′ and 92 at the upper end of segment 20a, descends again outside said segment up to the corresponding pulley 88 and then rises again to pulley 64′z.

Carriage 90 is mounted outside segment 20a of the slave arm and automatically moves in the opposite direction over a distance $Z_e/2$ equal to half the distance $Z_e$ over which are displaced segments 20b and 20c of the slave arm, when an electrical displacement is controlled. For this purpose, carriage 90 carries at its lower end a further pulley 94, onto which is wound an opposing cable 96, whereof one end is fixed at 98 to the lower part of segment 20a and whereof the other end is fixed at 100 to the upper part of segment 20b. Cable 96 passes onto a guidance pulley 102 mounted at the lower end of segment 20a of the slave arm between pulley 94 and fixing point 100.

As will be described in greater detail hereinafter, pulleys 66z and 66′z are arranged in the manner of pulleys 66d, 66′d, 66a, b, c and 66′a, b, c, respectively above shoulder pin 26 and above shoulder pin 30, in such a way that each of the cables 56z and 56′z passes in the immediate vicinity of the corresponding shoulder pin.

Figure 7:
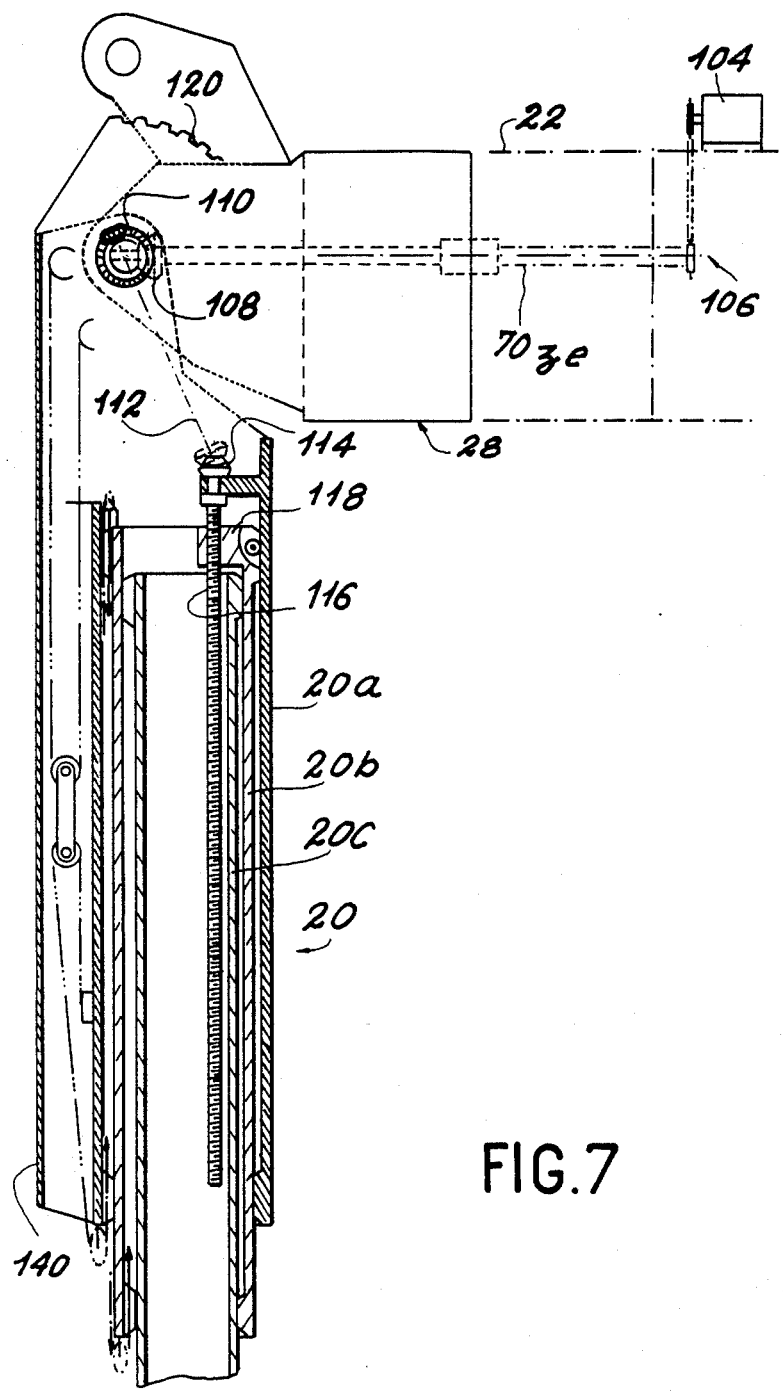
FIG. 7 a larger scale sectional view of part of the passage block and the upper part of the slave arm showing the means making it possible to control the extension of the slave arm under the action of electrical displacement means.

It can be seen in FIG. 7 that the carriages 62′ and 90 and the cables corresponding thereto are normally protected by a casing.

A description will now be given relative to FIG. 7 of the means making it possible to electrically control the displacement of slave arm 20 relative to the master arm. As has been stated particularly with reference to FIG. 6, these means act on intermediate segment 20b and consequently make it possible to simultaneously displace segments 20b and 20c of the slave arm.

This displacement is controlled by means of areduction gear 104 mounted on part 24 of the passage block and controlling, via a transmission of the chain-toothed wheel type 106, the rotation of another horizontal rotary shaft $70_{ze}$ completely traversing the central part 22 of the passage block. The other end of shaft $70_{ze}$, placed in part 28 of the passage block, controls via angle return pinions 108 the rotation of a toothed wheel 110 arranged coaxially to the shoulder pin 30 of the slave arm. The rotation of toothed wheel 110 is transmitted by an inclined shaft 112 to a threaded rod 116, positioned within the slave arm, parallel to the axis thereof and immobilized in translation relative to the upper part 20a. The transmission to threaded rod 116 of the rotation of toothed wheel 110 can also be brought about directly without shaft 112. The threaded rod 116 is extended downwards and cooperated with a tapped portion 118 formed in the intermediate part 20b of the slave arm, in such a way that its rotation controls a sliding of the parts 20b and 20c of the slave arm within part 20a.

The other means making it possible to control the displacements in X and Y of the slave arm relative to the master arm are well known and do not affect the invention, so that they will not be described here.

Figure 8:
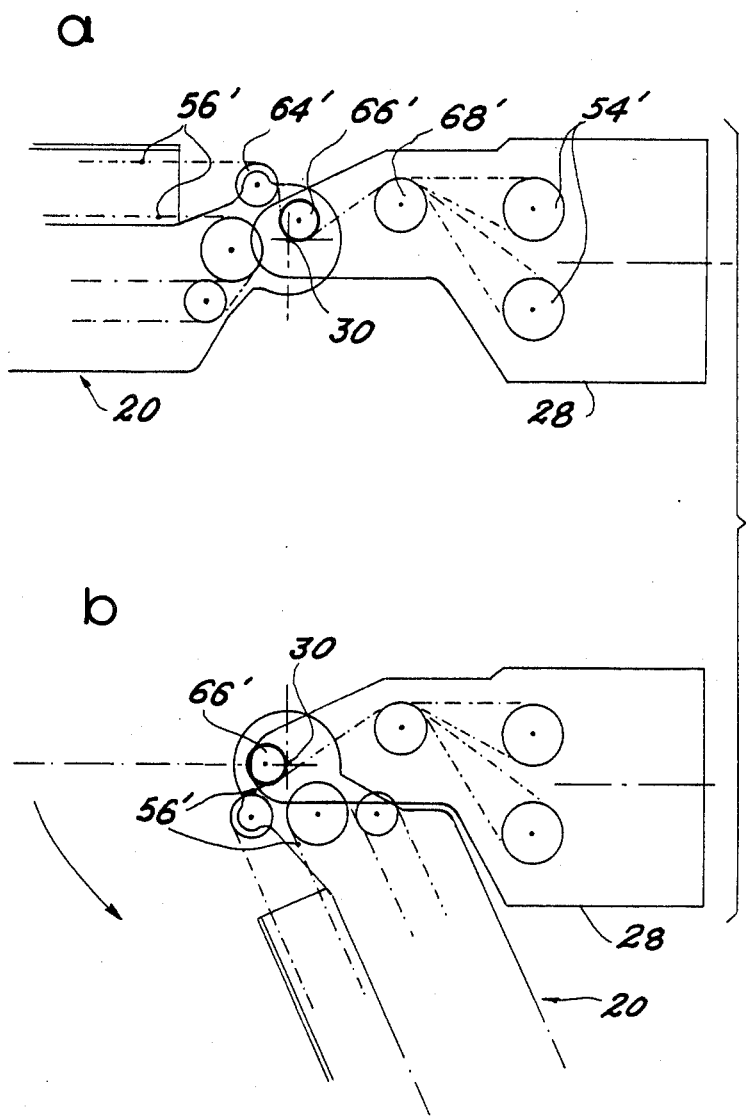
FIGS. 8a and 8b larger scale diagrammatic sectional views showing in two extreme positions the articulation of the shoulder of the slave arm of the passage block and the arrangement of the pulleys for guiding the control cables of the arm relative to said axis.

In order to complete the description of the cabling systems given with reference to FIGS. 2 to 6, reference will now be made to FIGS. 8a and 8b, which show the shoulder articulation of the slave arm in two extreme positions thereof. It is possible to see pulleys 66′ below which pass all the control cables 56′ of the slave arm. It can be seen that the arrangement of pulleys 56′ above shoulder pin 30 is such that each of the cables 56′ passes in the vicinity of said pin, no matter what the arm position. Moreover, this arrangement permits, in the manner illustrated in FIG. 8a, to bend the arm in direction Y by an increased angle compared with the prior art systems. In a comparable manner, the arrangement of pulley 66′ above the shoulder pin makes it possible to use longer segments 20a to 20c. This improves the relationship between the length of the extended arm and that of the retracted arm.

Finally, an arrangement comparable to that of the slave arm is provided on the master side, so that the length variation of the cabling system during a shoulder movement Y is automatically balanced.

What is claimed is:

1. A telescopic remote manipulator comprising a block for passing through a partition which rotates about its own axis, a telescopic master arm constituted by an upper segment and a lower segment and a telescopic slave arm constituted by an upper segment, an intermediate segment and a lower segment, said arms having two longitudinal axes and being articulated by their upper segments on the passage block about two shoulder pins orthogonal to the block axis, a control handle mounted at the free end of the master arm, a gripping member mounted at the free end of the slave arm, means for transmitting to the slave arm movements imparted to the master arm, means for transmitting to the gripping member movements imparted to the control handle, and means for displacing the slave arm relative to the master arm making it possible to modify the length and orientation of the arm about its shoulder pin and about the axis of the passage block without modifying the corresponding coordinates of the master arm, the means for transmitting to the gripping member movements imparted to the handle comprising, for each movement, at least one first cable means associated with the master arm for transmitting the corresponding movement of the control handle to a rotary shaft located in the passage block and at least one second cable means associated with the slave arm for transmitting the corresponding movement of the rotary shaft to the gripping member, wherein all the said second cable means associated with the slave arm pass over pulleys carried by a mobile carriage positioned externally of the slave arm and then on pulleys mounted on the slave arm in the vicinity of its shoulder pin in order to directly control the gripping member or the lower segment of the slave arm, and wherein means are provided for displacing the carriage along the slave arm, when there is a variation in the length of said slave arm which can be controlled by said means for transmitting to the slave arm movements imparted to the master arm and by said means for displacing the slave arm relative to the master arm, in the opposite direction of movement of the slave arm and over a distance equal to half said length variation, and wherein the means for displacing the carriage comprises an opposing cable means, whose ends are fixed respectively to the lower end of the upper segment and to the upper end of the lower segment of the slave arm, and which successively passes onto pulleys respectively mounted on the carriage and at the lower end of the upper segment, the upper end of the intermediate segment and the lower end of the intermediate segment of the slave arm.

2. A remote manipulator according to claim 1, wherein each of the cable means of the means for transmitting to the slave arm movements imparted to the master arm passes in the vicinity of the shoulder pin of the master and slave arms over at least one pulley carried by the upper segment of said master and slave arms and positioned above the shoulder pin, both on the slave arm and on the master arm.

3. A telescopic remote manipulator comprising a block for passing through a partition which rotates about its own axis, a telescopic master arm constituted by an upper segment and a lower segment and a telescopic slave arm constituted by an upper segment, an intermediate segment and a lower segment, said arms having two longitudinal axes and being articulated by their upper segments on the passage block about two shoulder pins orthogonal to the block axis, a control handle mounted at the free end of the master arm, a gripping member mounted at the free end of the slave arm, means for transmitting to the slave arm movements imparted to the master arm, means for transmitting to the gripping member movements imparted to the control handle, and means for displacing the slave arm relative to the master arm making it possible to modify the length and orientation of the arm about its shoulder pin and about the axis of the passage block without modifying the corresponding coordinates of the master arm, the means for transmitting to the gripping member movements imparted to the control handle comprising, for each movement, at least one first cable means associated with the master arm for transmitting the corresponding movement of the control handle to a rotary shaft located in the passage block and at least one second cable means associated with the slave arm for transmitting the corresponding movement of the rotary shaft to the gripping member, wherein all of the said second cable means associated with the slave arm pass over pulleys carried by a first mobile carriage positioned externally of the slave arm and then on pulleys mounted on the slave arm in the vicinity of its shoulder pin in order to directly control the gripping member or the lower segment of the slave arm, and wherein means are provided for displacing the first carriage along the slave arm, when there is a variation in the length of said slave arm which can be controlled by said means for transmitting to the slave arm movements imparted to the master arm and by said means for displacing the slave arm relative to the master arm, in the opposite direction of movement of the slave arm and over a distance equal to half said length variation, wherein the first cable means associated with the master arm pass over pulleys carried by a second mobile carriage positioned externally of the master arm and then on pulleys mounted on the master arm in the vicinity of its shoulder pin, before being connected to the control handle or to the lower segment of the master arm, and means are provided for displacing the second carriage along the master arm, when there is a length variation of the latter in the opposite direction and over a distance equal to half said length variation, and wherein the means for displacing the second carriage comprises an opposing cable means, whose ends are respectively fixed to the lower part of the upper segment and to the upper part of the lower segment of the master arm and which successively passes over pulleys mounted respectively on the second carriage and at the lower end of the upper segment of the master arm.

4. A remote manipulator according to claim 3, wherein each of the cable means of the means for transmitting to the slave arm movements imparted to the master arm passes in the vicinity of the shoulder pin of the master and slave arms over at least one pulley carried by the upper segment of said master and slave arms and positioned above the shoulder pin, both on the slave arm and on the master arm.

5. A telescopic remote manipulator comprising a block for passing through a partition which rotates about its own axis, a telescopic master arm constituted by an upper segment and a lower segment and a telescopic slave arm constituted by an upper segment, an intermediate segment and a lower segment, said arms having two longitudinal axes and being articulated by their upper segments on the passage block about two shoulder pins orthogonal to the block axis, a control handle mounted at the free end of the master arm, a gripping member mounted at the free end of the slave arm, means for transmitting to the slave arm movements imparted to the master arm, means for transmitting to the gripping member movements imparted to the control handle, and means for displacing the slave arm relative to the master arm making it possible to modify the length and orientation of the arm about its shoulder pin and about the axis of the passage block without modifying the corresponding coordinates of the master arm, the means for transmitting to the gripping member movements imparted to the control handle comprising, for each movement, at least one first cable means associated with the master arm for transmitting the corresponding movement of the control handle to a rotary shaft located in the passage block and at least one second cable means associated with the slave arm for transmitting the corresponding movement of the rotary shaft to the gripping member, wherein all of the said second cable means associated with the slave arm pass over pulleys carried by a first mobile carriage positioned externally of the slave arm and then on pulleys mounted on the slave arm in the vicinity of its shoulder pin in order to directly control the gripping member or the lower segment of the slave arm, and wherein means are provided for displacing the first carriage along the slave arm, when there is a variation in the length of said slave arm which can be controlled by said means for transmitting to the slave arm movements imparted to the master arm and by said means for displacing the slave arm relative to the master arm, in the opposite direction of movement of the slave arm and over a distance equal to half said length variation, wherein the means for transmitting to the slave arm movements imparted to the master arm comprise means for transmitting to the slave arm variation in the length of the master arm, the latter means including at least one third cable means associated with the master arm for transmitting the movement of the lower segment of the master arm to another rotary shaft located in said block and at least one fourth cable means associated with the slave arm for transmitting the corresponding movement of said another rotary shaft to the lower segment of the slave arm, said fourth cable means passing over at least one pulley carried by another mobile carriage positioned externally of the slave arm and then on at least one pulley mounted on the slave arm in the vicinity of its shoulder pin, in order to directly control the displacement of the lower segment relative to the other segments of the slave arm, means being provided for displacing said another carriage along the slave arm, when there is a variation in the length of the latter across said transmission means in the opposite direction and over a distance equal to half said length variation, and wherein the means for displacing said another carriage comprise an opposing cable means, whose ends are respectively fixed to the lower part of the upper segment and to the upper part of the intermediate segment of the slave arm and which passes successively over a pulley carried by said another carriage and a pulley carried at the lower end of the upper segment of the slave arm.

6. A remote manipulator according to claim 5, wherein the first and second cable means are used for transmitting to the gripping member a pivoting movement of the control handle about the longitudinal axis of the master arm cooperating respectively with drive means located at the upper end of the lower segment of the master and slave arms, in such a way that the lower segment of the master arm rotates with the control handle about the longitudinal axis of the master arm and the lower segment of the slave arm rotates with the gripping member about the axis of the slave arm.

7. A remote manipulator according to claim 5, wherein each of the cable means of the means for transmitting to the slave arm movements imparted to the master arm passes in the vicinity of the shoulder pin of the master and slave arms over at least one pulley carried by the upper segment of said master and slave arms and positioned above the shoulder pin, both on the slave arm and on the master arm.

* * * * *